US007591325B2

(12) United States Patent
Robieu

(10) Patent No.: US 7,591,325 B2
(45) Date of Patent: Sep. 22, 2009

(54) PORTABLE HAND-GUIDED POWER TOOL

(75) Inventor: Thomas Robieu, Schwaikheim (DE)

(73) Assignee: AEG Electric Tools GmbH, Winnenden (DE)

( * ) Notice: Subject to any disclaimer, the term of this patent is extended or adjusted under 35 U.S.C. 154(b) by 0 days.

(21) Appl. No.: 11/971,929

(22) Filed: Jan. 10, 2008

(65) Prior Publication Data

US 2008/0210447 A1 Sep. 4, 2008

(30) Foreign Application Priority Data

Jan. 10, 2007 (DE) ...................... 10 2007 001 591

(51) Int. Cl.
*B25D 17/04* (2006.01)
*B23B 45/16* (2006.01)

(52) U.S. Cl. ..................... 173/162.2; 173/170; 173/210

(58) Field of Classification Search .............. 173/162.1, 173/162.2, 210, 211, 170, 217; 267/137, 267/179, 140.12
See application file for complete search history.

(56) References Cited

U.S. PATENT DOCUMENTS

| | | | | |
|---|---|---|---|---|
| 4,282,938 | A * | 8/1981 | Minamidate | 173/162.2 |
| 4,749,049 | A * | 6/1988 | Greppmair | 173/162.2 |
| 4,800,965 | A * | 1/1989 | Keller | 173/162.2 |
| 5,697,456 | A * | 12/1997 | Radle et al. | 173/162.2 |
| 6,076,616 | A * | 6/2000 | Kramp et al. | 173/162.2 |
| 6,375,171 | B1 | 4/2002 | Zimmermann et al. | |
| 6,766,868 | B2 * | 7/2004 | Frauhammer et al. | 173/48 |
| 6,799,642 | B2 * | 10/2004 | Wolf et al. | 173/162.2 |
| 6,913,088 | B2 * | 7/2005 | Berger | 173/48 |
| 7,100,706 | B2 * | 9/2006 | Meixner et al. | 173/162.2 |
| 7,137,542 | B2 * | 11/2006 | Oki et al. | 173/162.2 |
| 7,287,601 | B2 * | 10/2007 | Hellbach et al. | 173/162.2 |
| 7,331,408 | B2 * | 2/2008 | Arich et al. | 173/201 |
| 7,472,760 | B2 * | 1/2009 | Stirm et al. | 173/162.1 |
| 2002/0104665 | A1 | 8/2002 | Wolf et al. | |

FOREIGN PATENT DOCUMENTS

| | | | |
|---|---|---|---|
| AU | 2004231220 | B1 | 6/2005 |
| DE | 100 36 078 | A1 | 2/2002 |
| DE | 102 36 135 | A1 | 2/2004 |

* cited by examiner

*Primary Examiner*—Scott A. Smith
(74) *Attorney, Agent, or Firm*—Gudrun E. Huckett

(57) ABSTRACT

A portable hand-guided power tool has a housing and a handle having a first leg and a second leg, wherein the handle is secured by the first and second legs to the housing such that the handle is pivotably connected by the first leg to the housing and the second leg is connected to the housing such that a pivoting movement between the handle and the housing is possible. A pressure spring is disposed between the second leg and the housing. A first pressure member is disposed at the handle and a second pressure member is disposed at the housing. The pressure spring is held with pretension between the first and second pressure members. The first pressure member has at least one hook element and, without the handle being mounted on the housing, the first pressure member is positive-lockingly hooked to the housing by engaging a receptacle of the housing so as to form a hook connection.

9 Claims, 4 Drawing Sheets

PORTABLE HAND-GUIDED POWER TOOL

BACKGROUND OF THE INVENTION

The invention relates to a portable hand-guided power tool, in particular a rotary hammer. The power tool comprises a housing and a handle having two legs that are secured to the housing wherein the handle is pivotably supported by means of the first leg on the housing. The connection of the second leg to the housing allows a pivoting movement between the handle and the housing to take place. Between the second leg and the housing a pressure spring is arranged and held under pretension between two pressure members.

Such a portable hand-held power tool is disclosed in German patent application 102 36 135 A1. The disclosed rotary hammer/chipper has a housing and a curved handle. The curved handle is connected with two legs to the housing. By means of the first leg, the handle is pivotably supported on the housing. The connection of the second handle to the housing allows a pivoting movement between handle and housing. Between the second leg and the housing there is a pressure spring that is secured by means of two pressure members with pretension. One of the two pressure members rests against a screw bush of the handle while the other pressure member is fixedly secured to the housing. In this way, the handle can be pivoted against the pretension of the pressure spring relative to the housing. This provides an antivibration system that reduces the operation-caused vibration level at the handle and thus at the hand of the operator.

This arrangement is effective as a vibration-reducing measure. However, mounting is complex. The spring arrangement is mounted from the side facing away from the handle. First, the pressure member provided for resting against the handle is pushed into the housing and subsequently the correlated pressure spring is threaded onto it. Finally, a sleeve as a pressure member secured to the housing is inserted into the pressure spring and axially screwed to the housing. For manufacturing this screw connection, the coil pressure spring must be subjected to pretension. The mounting expenditure is thus high. Mounting of the individual components from the side of the gearbox can be carried out only with the gearbox removed, i.e., in a very early assembly stage of the entire power tool. For exchanging or repairing the module, the power tool must be disassembled to a large extent.

SUMMARY OF THE INVENTION

It is an object of the present invention to further develop a power tool of the aforementioned kind in such a way that mounting is simplified without affecting negatively the antivibration effect.

In accordance with the present invention, this is achieved in that the pressure member assigned to the handle is positive-lockingly hooked to the housing, without the handle being mounted, by means of at least one hook element engaging a receptacle of the housing.

It is thus proposed that at least one of the two pressure members that secure the pressure spring with pretension is positive-lockingly hooked to the housing by means of the least one hook element engaging a receptacle. In particular, for forming the hook element, at least one, preferably two, flexible spring tabs engaging the receptacle are provided. For assembly, it is thus only necessary to insert the corresponding pressure member against the restoring force of the pressure spring to such an extent that the automatic positive-locking action is achieved. Alternative to the spring tabs or in combination therewith, the hook connection between the pressure member and the housing can be advantageously embodied as a bayonet connection. The pressure member can be inserted in a simple way in a rotated position. Subsequently, a simple bayonet-type rotation is carried out until the hook elements automatically engage or snap in place in the respective receptacle. These very simple assembly steps can be carried out as needed without a tool and without assistance by mounting aids. In particular, the suppression of the pressure spring during assembly is not required because the snap-in or bayonet-type attachment of the pressure member can be realized in one working step with the generation of the spring pretension in the pressure spring.

It can be expedient to attach with the afore described hook connection the pressure member facing away from the handle. In an advantageous further embodiment, that one of the pressure members is hooked that in the mounted state is pushed against the second leg of the handle, wherein the hooked pressure member together with the at least one hook element is supported in the housing so as to be movable in the axial direction of the pressure spring. In this connection, the receptacle for the at least one hook element is advantageously configured as a slotted hole of the housing extending in the axial direction. The afore described arrangement makes it possible to assemble completely the housing, including motor, gearbox and the like, and to mount the spring arrangement only thereafter, i.e., at a very late assembly stage. For repair or exchange of the arrangement it is only necessary to remove the handle. Motor and gearbox housing remain untouched. Hooking of the pressure member in a slotted hole of the housing makes it possible to apply first the spring pretension by means of the pressure member correlated with the handle. Hooking secures the pressure member in position wherein the pretension of the pressure spring is maintained. Subsequently, mounting of the handle can be carried out wherein the hooking action of the pressure member then loses its function. Within the slotted hole the pressure member can move freely as a result of the pivot movement of the handle so that the desired antivibration effect is achieved.

In an advantageous embodiment, the housing comprises a sleeve that receives the pressure spring and the hooked pressure member in its interior, wherein the sleeve is provided with the receptacle for the least one hook element. The interior arrangement of the axially movable pressure member provides a compact highly-loadable configuration wherein the subsequent mounting of the handle and its connection to the spring arrangement are simplified.

The sleeve has expediently at least one further slotted hole that is delimited by two axial stops; the slotted hole receives a sliding member of the handle that is configured especially as screw bush. In the axial direction, the receptacle for the hook element is expediently arranged at a side of the slotted hole for the slide member which side is facing away from the handle.

The sleeve has a double function: it guides the spring element with the correlated pressure member and guides as well as limits the pivot movement of the handle. The arrangement is compact and can be mounted easily.

DESCRIPTION OF THE PREFERRED EMBODIMENTS

Figure 1:
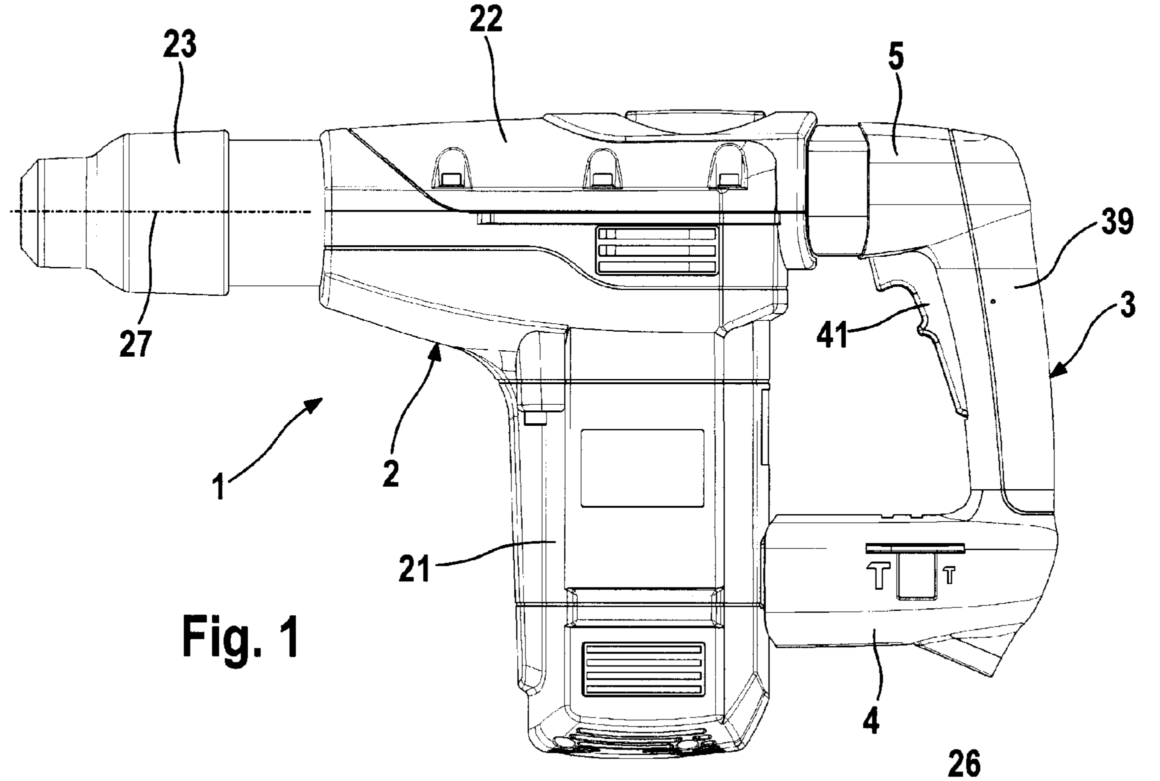
FIG. 1 is a side view of a power tool according to the invention exemplified in the form of a rotary hammer.

FIG. 1 illustrates a side view of a portable, hand-guided power tool according to the invention exemplified as a rotary hammer 1. Also possible are hammer drills, chippers or the like. The rotary hammer 1 has a housing 2 comprising a motor and gearbox housing 21 for a drive motor, not illustrated, and a gearbox, not illustrated, as well as a cover 22 screwed to the top. The chuck 23 is provided for receiving a tool (drill bit or chipping tool etc.). The chuck can be driven in rotation by the electric drive motor and the intermediate gearbox about axis of rotation 27. The percussion movement (hammer movement) is performed in the direction of axis of rotation 27.

On the side opposite the chuck 23 an approximately C-shaped handle 3 with two legs 4, 5 is secured on the housing 2 and supports a push button power switch 41 for actuating the electric drive motor. The handle 3 comprises two half shells 39, 40 that are essentially symmetrical to one another. The first half shell 39 is shown in FIG. 1 and the second half shell 40 is shown in FIG. 2.

Figure 2:
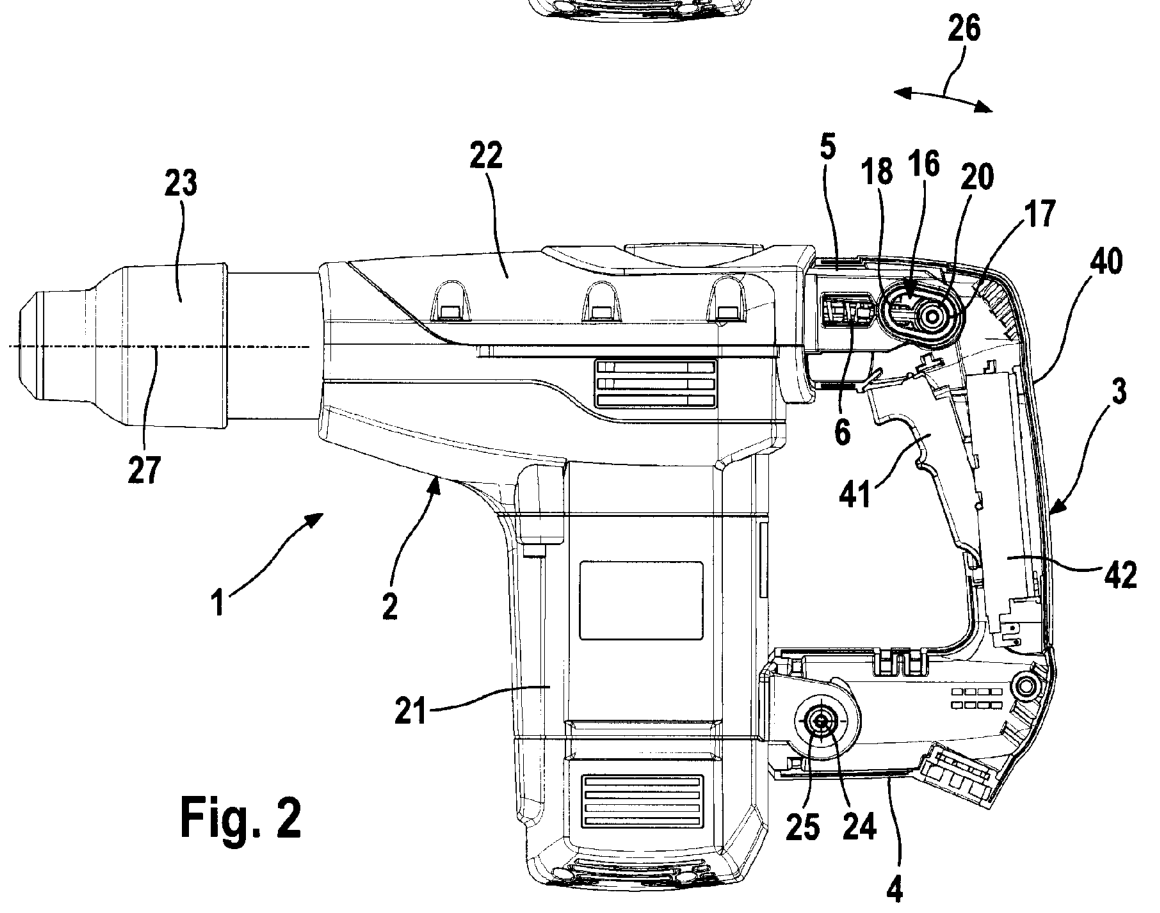
FIG. 2 shows the arrangement of FIG. 1 with removed half shell of the curved handle for illustrating the spring-tensioned pivotable support of the curved handle relative to the housing.

FIG. 2 shows the rotary hammer 1 according to FIG. 1 with removed half shell 39 of the handle 3. It can be seen that the handle 4 is supported with its first leg 4 on the housing 2, in particular so as to be pivotable on the motor and gearbox housing 21. For this purpose, a screw bush 25 for screw-connecting the two half shells 39, 40 provides a pivot axis 24. The connection of the second leg 5 to the housing 2 allows for a relative pivot movement between the handle 3 and the housing 2 in the area of the second leg 5 in accordance with double arrow 26. For this purpose, a pivot support is provided for the handle 3 by means of the screw bushes 20 of the two half shells 39, 40 wherein the screw bushes 20 are provided for screw-connecting the two half shells 39, 40 with one another and engage a slotted hole 16 of the housing 2. Two ends of the slotted holes 16 opposite one another in the longitudinal direction define stops 17, 18 for the screw bushes 20 so that the pivot movement of the handle 3 is limited in the direction of the double arrow 26.

A pressure spring 6 is supported with pretension relative to the screw bushes 20 so that the pivot movement of the handle 3 is carried out under the effect of the pretensioning force of the pressure spring 6. In operation of the rotary hammer 1 the vibration level at the handle 3 is thus lowered. The same features in FIGS. 1 and 2 are identified with the same reference numerals.

Figure 3:
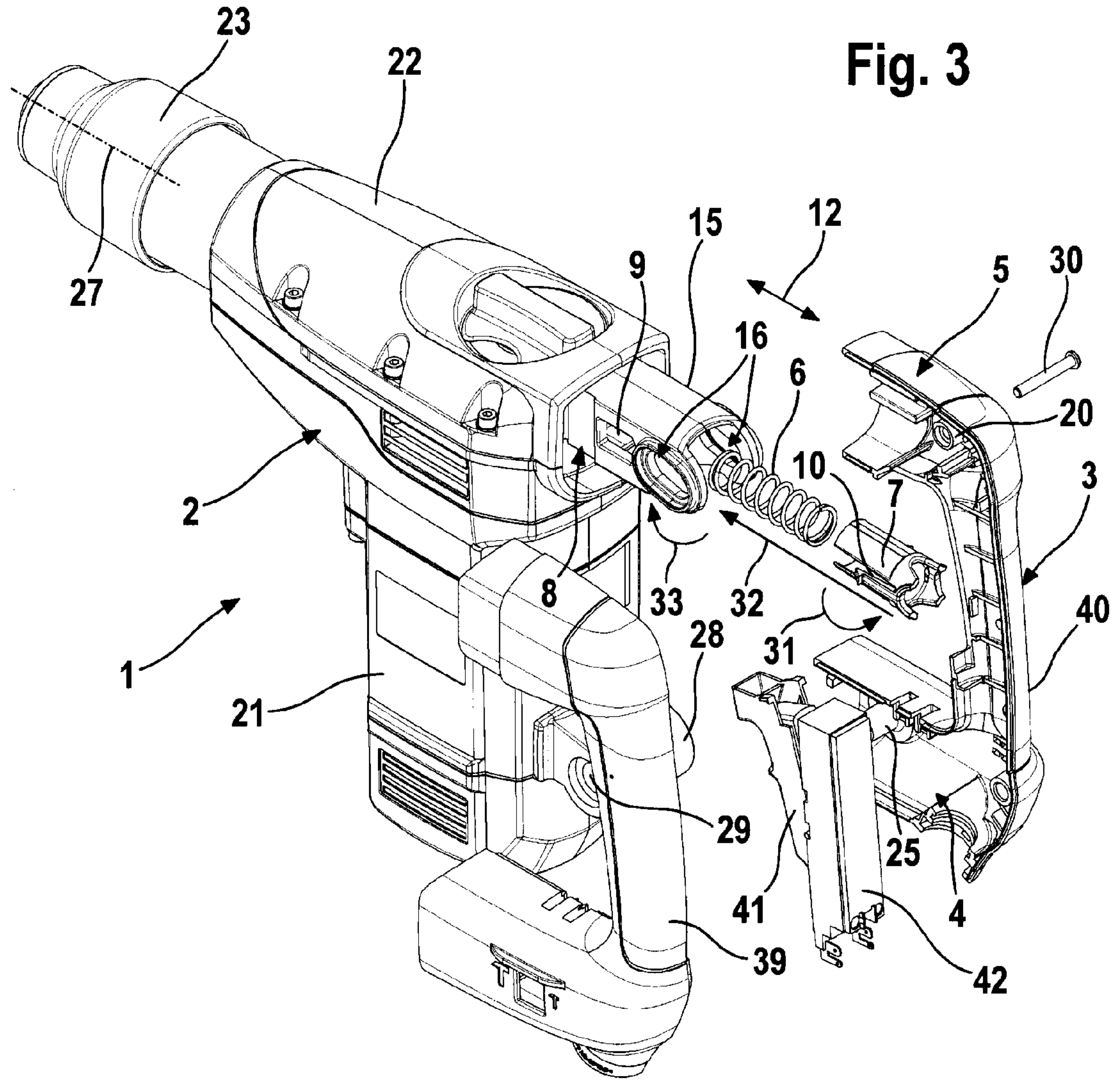
FIG. 3 is a perspective exploded view of the power tool according to FIGS. 1 and 2 with details regarding assembly of the pressure spring and the correlated pressure member.

FIG. 3 shows a perspective exploded view of the rotary hammer 1 according to FIGS. 1 and 2 with the two half shells 39, 40 of the handle 3 in the demounted state. Same features have the same reference numerals as in FIGS. 1 and 2. At the rearward and lower end of the housing 2 that is facing away from the chuck 23 2, a hinge part 28 with bore 29 is integrally formed on the motor and gearbox housing 21 wherein in the mounted state the screw bushes 25 of the two half shells 39, 40 pass through the bore 29 for forming the pivot axis 24 (FIG. 2).

In the area of the second leg 5 the pressure spring 6 is arranged in the axial direction 12 wherein the axial direction 12 is parallel to the axis of rotation 27 of the chuck 23 as well as at least approximately parallel to the pivot direction according to the double arrow 26 (FIG. 2). In the mounted state the pressure spring 6 embodied as a coil spring is held under pretension between two pressure members 7 and 8. The pressure member 8 is not illustrated in detail and is part of the cover 22. The pressure member 8 is formed by an inner end of a sleeve 15 integrally formed on the cover 22. The sleeve 15 is designed to receive in its interior the pressure spring 6. Moreover, the pressure member 7 to be explained in more detail in connection with FIG. 4 has at least one flexible springy hook element 10. In the illustrated embodiment, two hook elements 10 are positioned in the lateral direction of the rotary hammer 1 opposite one another. The sleeve 15 of the housing 2 has two receptacles 9 for the hook elements 10 that are positioned also opposite one another in the lateral direction. The two receptacles 9 for the two hook elements 10 are arranged in the axial direction 12 on a side of the two slotted holes 16 formed also within the sleeve 15 which side is facing away from the handle 3 (or facing the chuck 23).

Figure 4:
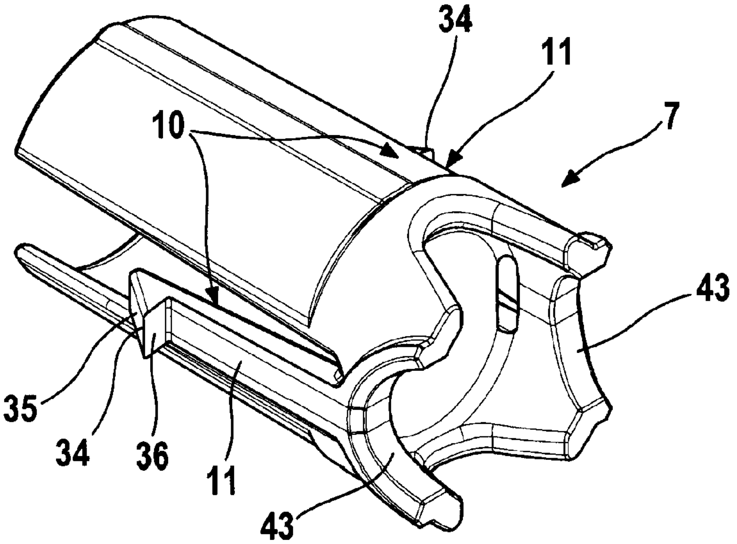
FIG. 4 is a detail view of the pressure member according to FIG. 3 showing details of integral hook elements.

FIG. 4 shows a detail view of the pressure member 7 according to FIG. 3 that is configured as an integral injection-molded plastic part. The pressure member 7 comprises an essentially cylindrical base member whose outer contour is designed for being slidably guided within sleeve 15 (FIG. 3) in the axial direction. The hook elements 10 positioned on opposite sides are configured as spring tabs 11. The end section of the spring tabs 11 which end section is flexible and springy in the radial direction comprises a radially inwardly deflectable locking hook 34 with a ramp 35 and a locking surface 36. The ramp 35 faces away from the handle 3 (FIG. 3) while the locking surface 36 faces the handle 3. Facing in the direction of the handle 3 there are semi-circular pressure surfaces 43 on the pressure member 7 for contacting the screw bushes 20 (FIG. 3).

Referring again to FIG. 3, it can be seen that the hook connection of the pressure member 7 with the housing 2, i.e., with the sleeve 15 of the cover 22, is configured as a locking connection (snap-on connection) or as a bayonet connection. For assembling the parts, first the pressure spring 6 is inserted into the sleeve 15 until it contacts the inner pressure member 8. When used purely as a locking connection, subsequently the pressure member 7 is inserted in the illustrated position in accordance with arrow 32 into the sleeve 15 causing the pressure spring 6 to be compressed. The ramps 35 (FIG. 4) of the spring tabs 11, subjected to the action of the inner walls of the sleeve 15, force the flexible locking hooks 34 radially inwardly. When the mounting position is reached, the locking hooks 34 lock in place radially outwardly in the respective receptacle 9 of the sleeve 15 as a result of the spring pretension generated by insertion. The pressure member 7 is thus hooked on the sleeve 15 of the housing 2 while the spring pretension of the pressure spring 6 is maintained.

Alternatively, the hook elements 10 can be configured as a bayonet connection of the pressure member 7 on the housing 2. For mounting, first the pressure spring 6 is inserted into the sleeve 15 until it rests against the inner pressure member 8. In the next step, the pressure member 7 is rotated from the position illustrated in FIG. 3 in accordance with arrow 31 by 90 degrees relative to the axial direction 12 and inserted in the axial direction 12 in accordance with arrow 32 into the sleeve 15. When doing so, the pressure spring 6 is pretensioned while the hook elements 10 are guided past the slotted holes 16. After complete axial insertion of the pressure member 7 in the direction of arrow 32, a 90 degree rotation in accordance with arrow 33 is carried out wherein the hook elements 10 will become hooked in the receptacles 9. Upon hooking, additionally a flexible locking of the hook elements 10 embodied as spring tabs 11 can be realized.

In this hooked state, the pressure member 7 can be let go. The pressure spring 6 that is supported against the end of inner pressure member 8 forces the pressure member 7 in the axial direction 12 toward the handle 3 wherein the two locking surfaces 36 (FIG. 4) rest against the ends of the receptacle 9 facing the handle 3 and in this way secure the pressure member 7 in position. In this way, the pressure spring 6 is pretensioned.

Subsequently, an electric switch 42 together with push button power switch 41 can be inserted into one of the two half shells 39, 40 so that they assume the position as shown in FIG. 2. For mounting the two half shells 39, 40 the screw bushes 25 are inserted into the bore 29 and the screw bushes 20 into the longitudinal slots 16 wherein the pressure surfaces 43 (FIG. 4) of the pressure member 7 now contact the screw bushes 20. Subsequently, the two half shells 39, 40 are connected by means of screws 30.

Instead of the illustrated arrangement it can also be expedient that the pressure member 7 that is slidable in the axial direction 12 and designed to contact the screw bushes 20 of the handle 3 surrounds the sleeve 15 externally. Also, it can be expedient to lock the pressure member 8 facing away from the handle 3 in the afore described way on a part of the housing 2.

Figure 5:
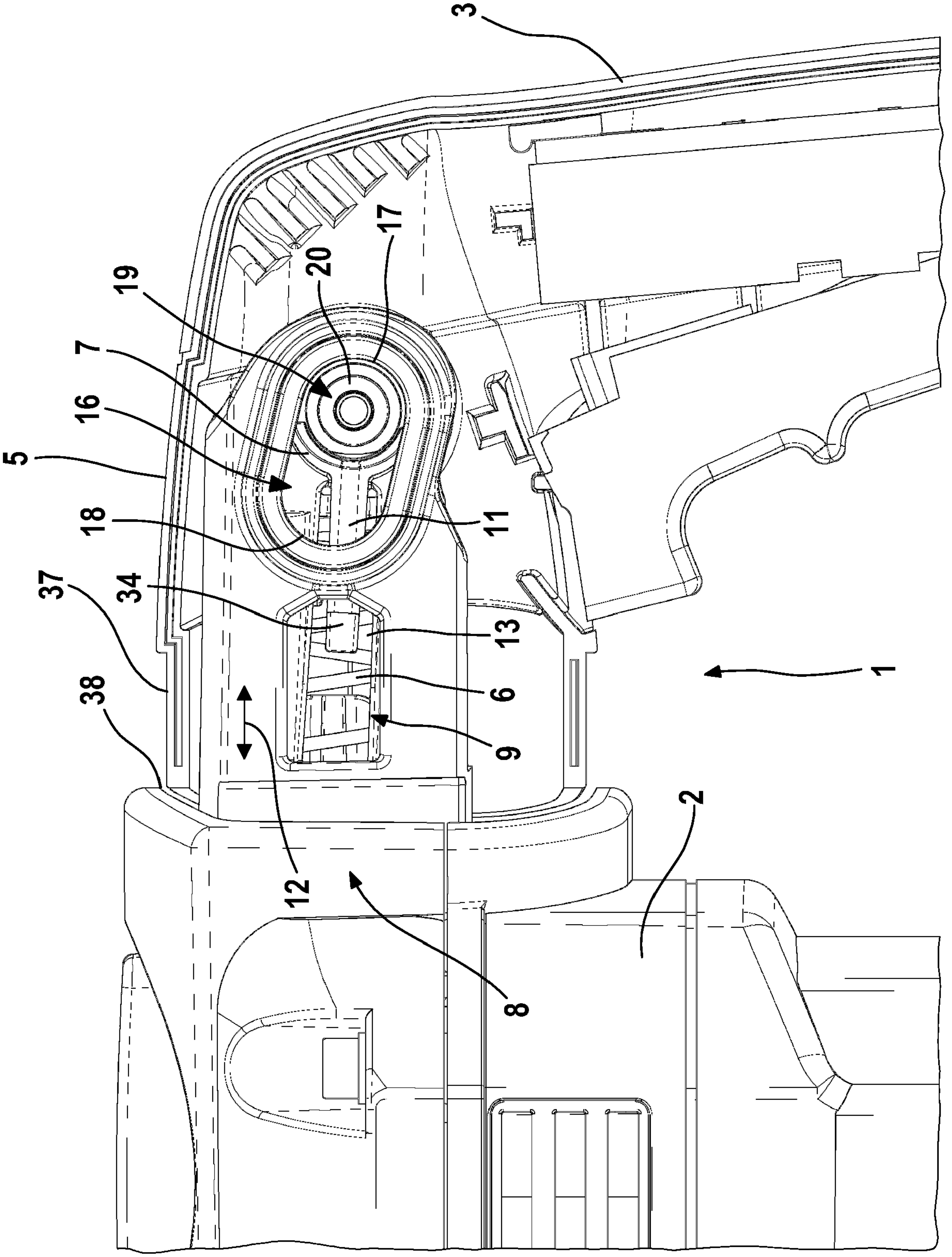
FIG. 5 is a detail view of the arrangement according to FIG. 2 in the area of a pivot guide of the handle limited by stops in the unloaded state.

FIG. 5 shows a detail view of the rotary hammer 1 according to FIG. 2 in the area of the second leg 5 of the handle 3. The handle 3 is shown in the unloaded position; accordingly, an end section 37 of the second leg 5 engages only slightly or does not yet engage an opening 38 of the housing 2. The pressure spring 6 supported on the pressure member 8 forces the pressure member 7 against the screw bushes 20 of the handle 3 so that the handle 3 is pushed away from the housing 2 in the axial direction 12 by rotating about the pivot axis 24 (FIG. 2). The screw bushes 20 form a sliding member 19 which in accordance with double arrow 26 (FIG. 2) is slidably guided in the slotted holes 16. The slotted hole 16 is delimited by the two stops 17, 18. In the unloaded state according to FIG. 5 the screw bushes 20 forming the sliding member 19 are pressed against the rearward stop 17 facing away from the housing 2. In this way, the pivot movement of the handle 3 is limited toward the rear, i.e., in a direction away from the housing 2.

The receptacles 9 for the locking hooks 34 of the spring tabs 11 or the hook elements 10 are also formed as slotted holes 13 extending in the axial direction 12 and allow a displacement travel of the pressure member 7 in the axial direction 12 relative to the housing 2. In the unloaded position of the handle 3 according to FIG. 5, the locking hooks 34 have a spacing relative to the proximal end of the slotted holes 13 in the axial direction 12 so that in the mounted state they perform no function. The limiting function for the pivot movement of the handle 3 is exerted instead by the stops 17, 18 in cooperation with the sliding member 19. The function of the spring tabs 11 or of the hook elements 10 is limited to the fixation of the pressure spring 6 and of the pressure member 7 during mounting and demounting as disclosed in connection with FIG. 3.

Figure 6:
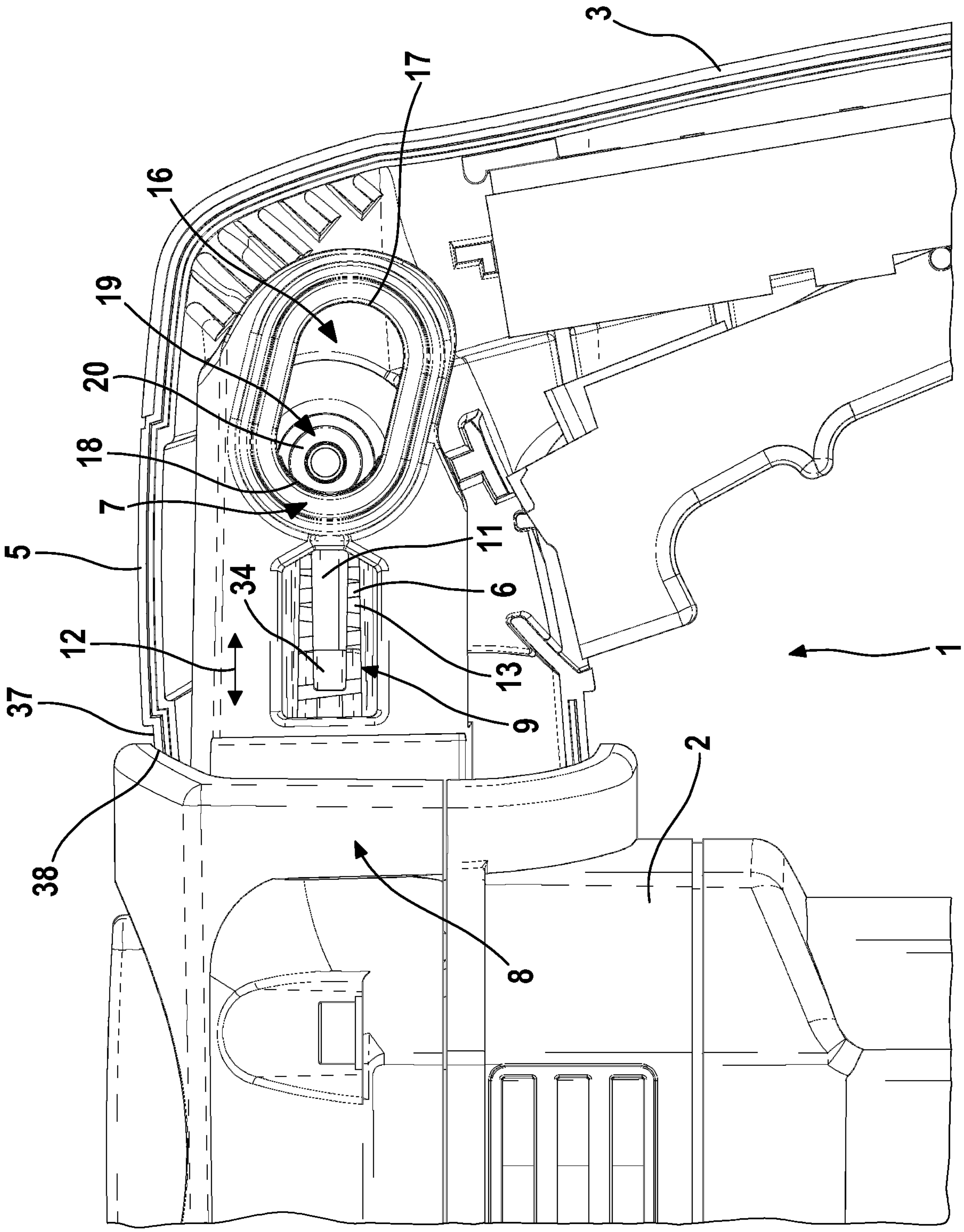
FIG. 6 shows the arrangement of FIG. 5 under pressure load acting on the handle in the axial direction.

FIG. 6 shows the arrangement according to FIG. 5 in the loaded state. By pressure being applied on the handle 3 in the axial direction 12 relative to the housing, the handle 3 carries out a pivot movement about pivot axis 24 (FIG. 2) in such a way that the second leg 5 is immersed with its end section 37 in the opening 38 of the housing 2. The sliding member 19 in the form of the screw bushes 20 has carried out—relative to the unloaded position according to FIG. 5—a pivot travel within the slotted hole 16. This pivot travel is limited by the sliding member 19 contacting the stop 18 facing the housing 2. This pivot movement of the handle 3 is carried out with entrainment of the pretensioned pressure member 7 resting on the screw bushes 20 against the pretension force of the pressure spring 6. The slotted hole 13 enables a free displacement travel of the pressure member 7 including the locking hooks 34 without them contacting the correlated end of the slotted hole 13. Instead, a travel limitation is provided by the interaction of the screw bushes 20 with the correlated stop 18 in the loading direction of the handle 3.

Between the two positions (unloaded or loaded) according to FIGS. 5 and 6 a free pivot movement of the handle 3 under the action of the pretension force of the pressure spring 6 is provided so that a reduction of the vibration level on the handle 3 is realized.

The specification incorporates by reference the entire disclosure of German priority document 10 2007 001 591.9 having a filing date of Jan. 10, 2007.

While specific embodiments of the invention have been shown and described in detail to illustrate the inventive principles, it will be understood that the invention may be embodied otherwise without departing from such principles.

What is claimed is:

1. A portable hand-guided power tool comprising:

a housing;

a handle having a first leg and a second leg, wherein the handle is secured by the first and second legs to the housing such that the handle is pivotably connected by the first leg to the housing and the second leg is connected to the housing such that a pivoting movement between the handle and the housing is possible;

a pressure spring disposed between the second leg and the housing;

a first pressure member disposed at the handle and a second pressure member disposed at the housing, wherein the pressure spring is held with pretension between the first and second pressure members;

wherein the first pressure member has at least one hook element and is mounted on the housing as a separate part independent of the handle, wherein the first pressure member is positive-lockingly hooked to the housing by engaging with the at least one hook element a receptacle of the housing so as to form a hook connection.

2. The power tool according to claim 1, wherein the at least one hook element is at least one flexible spring tab.

3. The power tool according to claim 1, wherein the at least one hook element comprises two flexible spring tabs.

4. The power tool according to claim 1, wherein the hook connection of the first pressure member and the housing is a bayonet connection.

5. A portable hand-guided power tool comprising:

a housing;

a handle having a first leg and a second leg, wherein the handle is secured by the first and second legs to the housing such that the handle is pivotably connected by the first leg to the housing and the second leg is connected to the housing such that a pivoting movement between the handle and the housing is possible;

a pressure spring disposed between the second leg and the housing;

a first pressure member disposed at the handle and a second pressure member disposed at the housing, wherein the pressure spring is held with pretension between the first and second pressure members;

wherein the first pressure member has at least one hook element and is mounted on the housing as a separate part independent of the handle, wherein the first pressure member is positive-lockingly hooked to the housing by engaging with the at least one hook element a receptacle of the housing so as to form a hook connection;

wherein the first pressure member hooked to the housing is pressed against the second leg of the handle, wherein the first pressure member hooked to the housing together with the at least one hook element is supported slidably within the housing in an axial direction of the pressure spring.

6. The power tool according to claim 5, wherein the receptacle is a slotted hole extending in the axial direction of the pressure spring.

7. The power tool according to claim 5, wherein the housing comprises a sleeve having an interior that receives the pressure spring and the first pressure member hooked to the housing, wherein the receptacle is provided on the sleeve.

8. The power tool according to claim 7, wherein the sleeve has a slotted hole delimited by two axial stops and wherein the handle has a sliding member that is a screw bush, wherein the sliding member is received in the slotted hole.

9. The power tool according to claim 8, wherein the receptacle is arranged on a side of the slotted hole which side is facing away from the handle in the axial direction of the pressure spring.

* * * * *